INVENTORS.
GERHARD OTTEN
RUDOLF HALDER
BY HORST SCHREIBER
ATTORNEYS

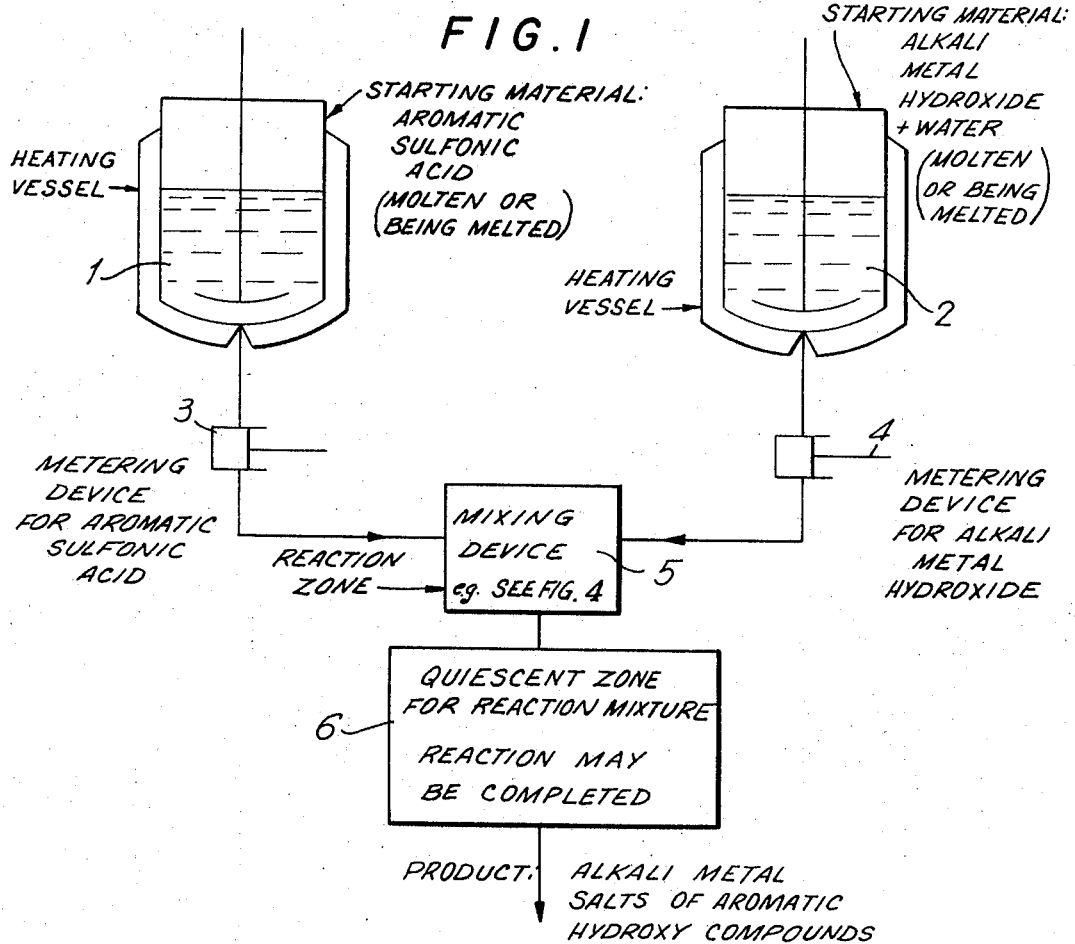
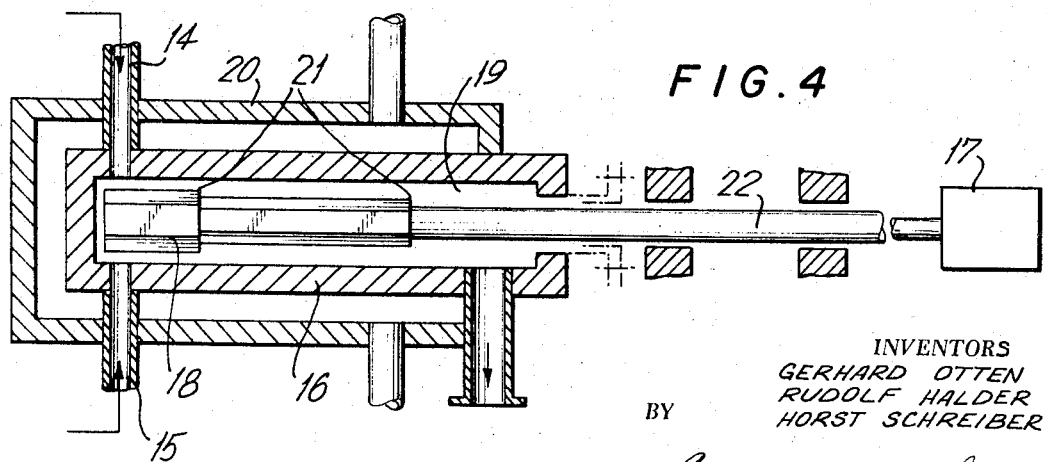

_United States Patent Office_ 3,426,083
Patented Feb. 4, 1969

3,426,083
METHOD FOR THE MANUFACTURE OF ALKALI METAL SALTS OF AROMATIC HYDROXY COMPOUNDS
Gerhard Otten, Frankfurt am Main, and Rudolf Halder and Horst Schreiber, Hofheim, Taunus, Germany, assignors to Farbwerke Hoechst Aktiengesellschaft vormals Meister Lucius & Brüning, Frankfurt am Main, Germany, a corporation of Germany
Filed May 28, 1965, Ser. No. 459,819
Claims priority, application Germany, May 30, 1964, F 43,024
U.S. Cl. 260—628                5 Claims
Int. Cl. C07f 1/00; C07c 37/04

ABSTRACT OF THE DISCLOSURE

A process has been provided for a continuous preparation of an alkali metal salt of hydroxy-benzene, 1,3-dihydroxy benzene, 1-hydroxy naphthalene, or 2-hydroxy naphthalene. This process comprises rapidly and homogeneously mixing a continuous stream of a molten benzene sulfonic acid, benzene-1,3-disulfonic acid, naphthalene-1-sulfonic acid, or naphthalene-2-sulfonic acid with a continuous stream of liquid alkali metal hydroxide having a concentration of 50 to 100% by weight, the balance being water. On a mole basis, at least 3 moles of the alkali metal hydroxide are being used per one of sulfonic acid substituent of the starting compound.

---

It is known to prepare alkali metal salts of aromatic hydroxy compounds, for example sodium resorcinate, by placing alkali metal salts of aromatic sulfonic acids, for example, the sodium salt of 1,3-benzene-disulfonic acid into an electrically heated vessel with sodium hydroxide in a quantity somewhat greater than the theoretical quantity and then heating the reactants to 350° C. while stirring. This method has the disadvantage that heating of the solid reaction mass requires several hours and that the reaction mass passes through a pasty phase. For this reason, vessels with very strong stirring devices are necessary for this process (Ullmann, vol. 14, page 681).

It is also known to prepare such alkali metal salts by mixing the alkali metal salts of the corresponding aromatic sulfonic acids with liquid sodium hydroxide at 350° C. in a hammer mill (British specification 939,-570). In this process, the reaction takes place within a very short time. The product formed falls through a sorting sieve mounted at the bottom of the hammer mill into a vessel containing water. The steam formed is drawn off laterally and condensed.

In the afore-mentioned known processes it was considered necessary to use the aromatic sulfonic acids to be reacted in the form of dry alkali metal salts. Thus, it was necessary first to convert the aromatic sulfonic acids into the corresponding alkali metal salts and then to isolate the latter prior to reacting them with sodium hydroxide. The preparation and isolation of the alkali metal salts of aromatic sulfonic acids, however, requires a great amount of energy. For example, the sodium salt of 1,3-benzene-disulfonic acid is prepared by sulfonating benzene and reacting the mixture thus obtained which contains 1,3-benzene-disulfonic acid, in aqueous solution with a sodium compound, for example, sodium hydroxide, sodium carbonate, sodium sulfite or sodium sulfate, while removing by cooling from the outside and/or by vaporization with water, the evolved heat of neutralization and dilution. The resulting aqueous solution of sodium salt of 1,3-benzene-disulfonic acid is then concentrated, if necessary, after precipitation of any foreign salts, until the dry disodium salt of 1,3-benzene-disulfonic acid is obtained. Since the aqueous solutions so obtained contain a maximum of only 50% by weight of the sodium salt, at least 1 kg. of water must be evaporated to obtain 1 kg. of dry salt (Ullmann, 3rd edition, vol. 4, pages 308/309, Kirk-Othmer, vol II, page 714).

Thus, referred to the free aromatic sulfonic acids, the known processes are multistage processes which have, in addition thereto, the disadvantage that they require a great amount of energy because of the high heat of vaporization of water.

Now, we have found that the alkali metal salts of aromatic hydroxy compounds can be prepared from corresponding aromatic sulfonic acids in a single stage process and without high energy requirements, by rapidly and intimately admixing molten aromatic sulfonic acid with a continuous stream of liquid alkali metal hydroxide having a strength of from 50 to 100% by weight, preferably 70 to 95% by weight, the balance being water. The process is particularly adapted to be carried out in a continuous manner, i.e., by rapidly and intimately admixing continuous streams of the reactants in liquid or liquified state.

The aromatic sulfonic acids that are especially suitable in the method of this invention are, for example, benzene-sulfonic acid, 1,3-benzene-disulfonic acid or 1- or 2-naphthalene-sulfonic acid.

The exchange of the aromatically bound sulfonic acid groups by hydroxy groups without supply of heat energy is effected in the process of the present invention during the rapid and thorough mixing of the aromatic sulfonic acid with the alkali metal hydroxide. The exothermic reactions which take place during this mixing, especially that of the neutralization, supply the heat required for the exchange reaction.

Prior to the mixing of the aromatic sulfonic acid with the alkali metal hydroxide, both components are, if necessary, heated to temperatures above the solidification point. It is of advantage to use the aromatic sulfonic acid directly following its preparation by a known process, because the sulfonic acid is then obtained in molten form, so that heating and melting of this component is not necessary.

The quantitative proportions of aromatic sulfonic acid to alkali metal hydroxide should be such that at least 3 mols of alkali metal hydroxide are made available for each sulfonic acid group per mol of aromatic sulfonic acid. It is often of advantage to use the alkali metal hydroxide in a slightly greater excess, for example, in a molar excess of 1:3.5.

Apparatus suitable for carrying out the method of this invention is illustrated by way of example in the accompanying drawing, wherein:

FIGURE 1 is a diagrammatic flow sheet;

FIGURE 4 is a cross-sectional view through another form of mixing device.

Figure 2:
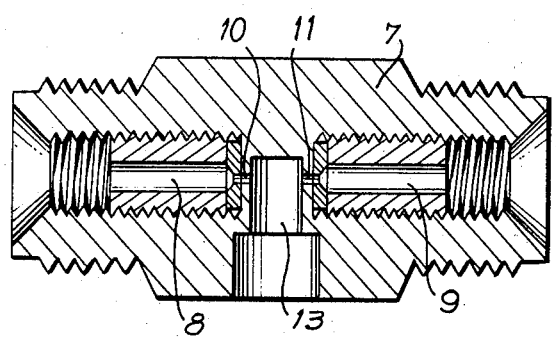
FIGURES 2 and 3 are cross-sectional views, at right angles to one another, of one form of mixing device.

Referring now to FIGURE 1, the aromatic sulfonic acid, which may be in the molten state as obtained in the manufacture, is introduced into vessel 1, or if introduced in solid state into vessel 1, it is heated to a temperature above the melting temperature so that it is in any case present in liquid form. The alkali metal hydroxide having a concentration in the afore-said range, is introduced into vessel 2 and therein heated to a temperature above its solidification point which is the higher the smaller the water content is. Both liquids are then dosed by means of metering devices 3 and 4 and passed to a mixing device 5 in which they are rapidly and thoroughly mixed to avoid local overheating. The heat set free by the reactions that take place, especially the neutralization, is so high that the whole mixture is strongly heated up, thus allowing the exchange reaction to proceed. From the mixing device 5, the reaction mixture may be passed, if it has not completely reacted, into a relatively quiescent zone 6, in which the reaction is completed to yield the corresponding alkali metal salt of the aromatic hydroxy compound. The reaction period is relatively short and amounts to from less than one to about 30 seconds, depending on the temperature; if desired, it may also be longer. As the zone of relative quiescence, there may be used in the simplest case an unheated, insulated tube, the steam formed during the reaction serving as propellant; it is also possible to use conveyor bands or screws. Care must be taken, however, that the pressure does not exceed about 20 atmospheres to avoid decomposition of the alkali metal salts of the aromatic hydroxides that are formed.

Figure 3:
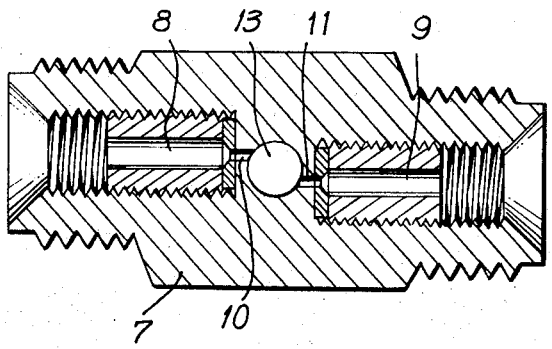

Referring now to FIGURES 2 and 3, one embodiment of a mixing device comprises a metal casing 7 provided with passages 8 and 9 having considerably constricted terminal portions 10 and 11 and serving for the feed of products. These narrow channels open tangentially into a mixing chamber 13 whereby a strong turbulence is produced in this chamber. The mixing chamber may be followed by a zone of relative quiescence, not shown, the first part of which may be provided with suitable heating or cooling means for controlling the temperature.

The mixing device illustrated in FIGURE 4 has the form of an annulus reactor. This annulus reactor comprises a jacket tube 16 into which passes a shaft 22 having a diameter of such a size that an annulus of about 2 to 3 mm. between shaft and jacket tube is formed. With a rotating shaft, this narrow annulus assures thorough mixing. The aromatic sulfonic acid is fed through a conduit 14 and the liquid alkali metal hydroxide, having a strength of 50 to 100% by weight, is fed through a conduit 15 to the annulus reactor. The components enter at the head of the annulus and are thoroughly mixed by shaft 22 rotating in the tube. The shaft is driven by an electric motor 17 with a speed of for example, 1450 rev./min. The motor is suitably arranged in such a manner that the sealing of the shaft (stuffing box) is positioned at the side opposite to the feed side of the components. Owing to the location of the shaft sealing (stuffing box) at the exit side of the reaction mixture from the annulus tube, only a small pressure can build up there.

In order to obtain immediate and thorough mixing of both components, it is of advantage to use a shaft the cross-section of which in the area of the reaction zone has the form of a polygon (quadrangle, hexagon, octagon or dodecanon). The flow is broken by the edges of the rotating shaft whereby the turbulence is considerably increased. These measures provide a mixing effect of more than 99.9%. The mixture flows then through annulus 19 which can be heated or cooled from the outside, thus enabling control of the temperature. The reaction mixture consists of steam formed by the reaction and solid particles suspended therein. Since the volume of the steam is about 200 to 300 times greater than that of the solids formed, flow speeds of 10 to 15 m./second can be attained in the annulus without the pressure at the feed side of the components exceeding 2 atmospheres gage. In order to avoid that flow speeds in the annulus and pressures at the entrance side of the components are too high, the shaft may be reduced stepwise, once or several times, and the width of the annulus can be adapted to the quantity of the steam formed.

It may be of advantage to remove by cooling an excess of heat in a first mixing or reaction zone, in order to prevent decomposition reactions. It may likewise be of advantage to supply heat in a second zone.

The apparatus described above can be adapted to the physical parameters of the aromatic sulfonic acids and the alkali metal hydroxide to be reacted, for example, by heating or not heating the first part of the zone of retention, by altering the cross-section of the shaft in the reaction zone, by heating or cooling the reaction tube, by stepwise reduction of the effective diameter of the shaft, by adapting the width of the annulus to the quantity of steam formed, and may then be used for the manufacture of alkali metal salts of the various aromatic hydroxy compounds.

The above-described apparatus serving for carrying out the process of the present invention also permits continuous operation.

The following examples illustrate the invention but they are not intended to limit it thereto:

EXAMPLE 1

A liquid, water-containing sodium hydroxide solution having a strength of 80% at a rate of 20 liters per hour and 1,3-benzene-disulfonic acid having a strength of about 90% (prepared according to German specification 1,063,-151) having a temperature of 135° C. in a quantity of 15 liters per hour were introduced by means of dosing pumps through conduits 14 and 15 into an annulus reactor of the type illustrated in FIGURE 4. The head of the reactor tube 16 where both components were fed in, was cooled by means of a cooling medium of about 100° C., whereby part of the reaction heat (neutralization heat) was removed. The shaft, which rotated with a speed of about 1450 rev./min., had at the head side 18 a terminal part the cross-section of which presented the form of a hexagon. The annulus following thereon had a width of 3 mm. Shaft 22 then had a stepwise reduced part 21 whereby the annulus was enlarged to 4 mm. in the middle of the annulus reactor tube. By this enlargement, the annulus was adapted to the quantity of steam set free in the reaction, so that too high a pressure loss was avoided. The annulus reactor tube had a total length of 250 mm. The effluents were conducted to a flow tube which was 10 m. long and had an inner width of 20 mm.; this tube was heated electrically and allowed adjustment of the temperature. The reaction mixture which left the flow tube had a temperature in the range of 380° to 430° C. and was then passed into an unheated, insulated tubular coil that had a length of 30 m. and served as the zone of relative quiescence 6 in which the reaction was completed. The mixture leaving the tubular coil was passed into a reception vessel filled with water; the steam was drawn off laterally. The mixture that left the flow tube contained about 28–30% by weight of sodium resorcinate. The rest consisted of sodium sulfite, sodium sulfate, water and unreacted sodium hydroxide solution.

EXAMPLE 2

A liquid, water-containing sodium hydroxide solution having a strength of 85% was introduced at a rate of 25 kilograms per hour and 2-naphthalene-sulfonic acid obtained by sulfonation of naphthalene with sulfuric acid having a strength of 96%, was introduced at a rate of 41 kilograms per hour, by means of dosing pumps through conduits 14 and 15 into an annulus reactor of the type illustrated in FIGURE 4. The shaft, which was rotated with a speed of about 1450 rev./min., had at the head side 18 a terminate part the cross-section of which presented the form of a hexagon. The annulus following thereon had a width of 3 mm. The annulus reactor tube had a total length of 250 mm. and was followed by a flow tube which was 10 m. long and had an inner width of 20 mm.; this tube was heated electrically and allowed adjustment of the temperature. The reaction mixture which left the flow tube had a temperature in the range of 380 to 430° C. and was then passed into an unheated, insulated tubular coil that had a length of 30 m. and served as the zone of retention in which the reaction was completed. The mixture leaving the tubular coil was passed into a reception vessel filled with water; the steam was drawn off laterally. The mixture that left the flow tube contained about 42–45% by weight of β-sodium naphtholate. The rest consisted of sodium sulfite, sodium sulfate, water and unreacted sodium hydroxide solution.

We claim:
1. A continuous process for production of an alkali metal salt of hydroxy-benzene, 1,3-dihydroxy benzene, 1-hydroxy-naphthalene or 2-hydroxy-naphthalene which comprises (a) rapidly and homogeneously mixing in a mixing zone a continuous stream of molten benzene sulfonic acid, benzene-1,3-disulfonic acid, naphthalene-1-sulfonic acid or naphthalene-2-sulfonic acid with a continuous stream of liquid alkali metal hydroxide having a concentration of 50 to 100% by weight, the balance being water, provided that on a mole basis, at least 3 moles of alkali metal hydroxide is being used per one sulfonic acid substituent of the sulfonic acid starting material; (b) reacting the admixture for a period from about 1 to about 30 seconds; (c) expanding rapidly the reaction mixture into progressively larger zones, by means of steam formed during the exothermic part of the reaction, to pressure of less than about 20 atmospheres; (d) maintaining the temperature of the reaction mixture during the expansion stage by heating or cooling in the range of 380° to 430° C.; and (e) passing the reaction mixture into an unheated quiescent zone for completion of the reaction.

2. A process as defined in claim 1 wherein 1,3-benzene disulfonic acid is reacted with sodium hydroxide.

3. A process as defined in claim 1 wherein β-naphthalene sulfonic acid is reacted with sodium hydroxide.

4. A process as defined in claim 1 wherein molten 1,3-benzene-disulfonic acid is rapidly and intimately admixed with an about 700% stoichiometric excess of sodium hydroxide in the form of a solution having a strength of from 70 to 95% by weight.

5. A process as defined in claim 1 wherein molten 2-naphthalene-sulfonic acid is rapidly and intimately admixed with an about 350% stoichiometric excess of sodium hydroxide in the form of a solution having a strength of from 70 to 95% by weight.

References Cited

UNITED STATES PATENTS

| 2,353,237 | 7/1944 | Harris | 260—628 |
| 2,773,908 | 12/1956 | Cake | 260—628 |
| 2,856,437 | 10/1958 | Cake | 260—628 |

OTHER REFERENCES

Groggins, P.: Unit Processes In Organic Synthesis, New York, McGraw-Hill Book Company, Inc., 1952, p. 662.

LEON ZITVER, *Primary Examiner.*

H. ROBERTS, *Assistant Examiner.*

U.S. Cl. X.R.

23—290, 252